Sept. 10, 1940.　　　　A. KURTI　　　　2,214,335

PLANETARY GEAR TRANSMISSION

Filed June 23, 1938　　　3 Sheets-Sheet 1

INVENTOR.
*Aladar Kurti,*

BY

*Hoguet, Neary & Campbell,*
ATTORNEYS

Sept. 10, 1940.  A. KURTI  2,214,335
PLANETARY GEAR TRANSMISSION
Filed June 23, 1938  3 Sheets-Sheet 2

INVENTOR.
Aladar Kurti,
BY
Hoguet, Neary & Campbell,
ATTORNEYS

Fig. 3

Patented Sept. 10, 1940

2,214,335

UNITED STATES PATENT OFFICE 2,214,335

PLANETARY GEAR TRANSMISSION

Aladar Kurti, Highland Park, N. J., assignor to Mack Manufacturing Corporation, Long Island City, N. Y., a corporation of Delaware Application June 23, 1938, Serial No. 215,315

7 Claims. (Cl. 74—270)

This invention relates to transmissions and particularly to variable speed planetary transmissions suitable for use in vehicles and other variable speed power-operated machines.

Planetary transmissions of various types are well known and for many years were widely used in automobiles and in many other power-operated devices. However, this type of transmission had several disadvantages. As a consequence they have been supplanted almost entirely by non-planetary transmissions.

The planetary transmissions most commonly used included brake bands and brake drums which controlled the operation of the planetary gear systems, of which there were usually several, in order to provide the desired number of speed changes. The brake bands were subject to severe wear and required replacement, thereby necessitating frequent servicing of the transmission. In addition, the large number of gears in the transmission created considerable friction and reduced the efficiency of the entire system, as well as formed such complex and unwieldly constructions that repairs were difficult to make and access to the transmission could be had only by tearing down the entire mechanism.

More recently, planetary transmissions have been devised which include electromagnetic clutches and brakes for controlling the operation of the various gear combinations, these clutches and brakes being used to replace the brake band and brake drum constructions previously used. While the electromagnetic clutches reduce the servicing requirements of the transmission, little if any improvement was made in the accessibility of the parts or in rendering the device more compact and reducing the friction losses.

An object of the present invention, therefore, is to provide compact planetary types of transmissions which are accessible for servicing and which are highly efficient in operation.

Another object of the invention is to provide planetary gear transmissions having a plurality of forward and reverse speeds in which the driving and driven elements thereof are actuated non-differentially in all speeds.

A further object of the invention is to provide planetary gear transmissions which can be positioned so that the driven shaft is disposed at an angle to the power shaft, thereby allowing the transmissions to be placed in substantially any desired position or location.

An additional object of the invention is to provide a planetary transmission having electromagnetic clutches and brakes therein which are supported in such a way that they can be readily removed for adjustment and servicing and upon removal afford ready access to the gear trains of the transmission.

Other objects of the invention will become apparent from the following description of typical forms of the invention.

Planetary gear transmissions embodying the present invention include aligned or coaxial drive and driven shafts, the latter having a spider fixed thereto which supports the planet gears in position to mesh with and transmit the torque delivered by the drive shaft by means of sun and internal gears actuated by or freed from the drive shaft by electromagnetic clutches. More particularly, the transmissions include electromagnetic clutch elements which are rotated by the drive shaft, and fixed electromagnet brake elements which control the movement of armatures carrying sun and internal gears with which the planet gears mesh, said electromagnetic and clutch brake elements being selectively energized to produce a plurality of different speed ratios. While electromagnetic clutches and brakes are used in the preferred form of transmission, it will be understood that hydraulically or pneumatically actuated clutches and the like may be used. The clutches may be of the single plate multiple disk, conical or other type, as desired.

A typical form of transmission includes a pair of annular electromagnets which are fixed to and rotatable with the drive shaft. A clutch armature having a sun gear thereon cooperates with one of the electromagnets to couple the sun gear to the drive shaft or allow the sun gear to rotate or remain stationary. A second armature having an internal gear thereon cooperates with the other electromagnet in a similar way and in addition is controlled in its operation by means of a third electromagnet which is fixed to the casing of the transmission. Planet gears which are supported by a spider fixed to the driven shaft mesh with the sun and internal gears mentioned above. The spider also carries a second set of planet gears disposed on the side opposite to the first set of planet gears, the two sets of planet gears being coupled to rotate simultaneously. The second set of planet gears mesh with a second sun gear and by means of idler gears are operatively connected to an internal gear. The second mentioned sun and internal gears have armatures which cooperate with electromagnets carried by a removable end cover on the casing whereby the internal and sun gears selectively can be fixed against rotation or allowed to rotate freely.

In transmissions of this type, the various clutch and gear elements are arranged substantially symmetrically with respect to the spider, which in all speeds couples the drive shaft to the driven shaft, thereby uniformly distributing the stresses applied to the spider and greatly strengthening the entire assembly.

The spider is rotated in accordance with the movement of the planet and idler gears along the peripheries of the sun and internal gears, one set of planet gears being driven by a rotating gear or gears. The movement of the planet gears and spider are thus positive and no differential rotation of the drive and driven shaft can occur. Friction losses, therefore, are reduced for the reason that the combined planet and idler gears act substantially like the conventional idler shaft in a shiftable gear type of transmission, there being only one additional rotary component added to the motion of the gears; this component acting to rotate the driven shaft.

The relationship of the electromagnetic clutches, brakes, shafts, and gears to the casing of the transmission facilitates removal, repair and replacement of these parts and other servicing operations which may be required during the life of the transmission, while allowing the entire transmission to be made substantially as compact as the ordinary non-planetary transmission.

For a better understanding of the present invention, reference may be had to the accompanying drawings in which:

Figure 3 is a view in horizontal section of a modified form of transmission.

Figure 1:
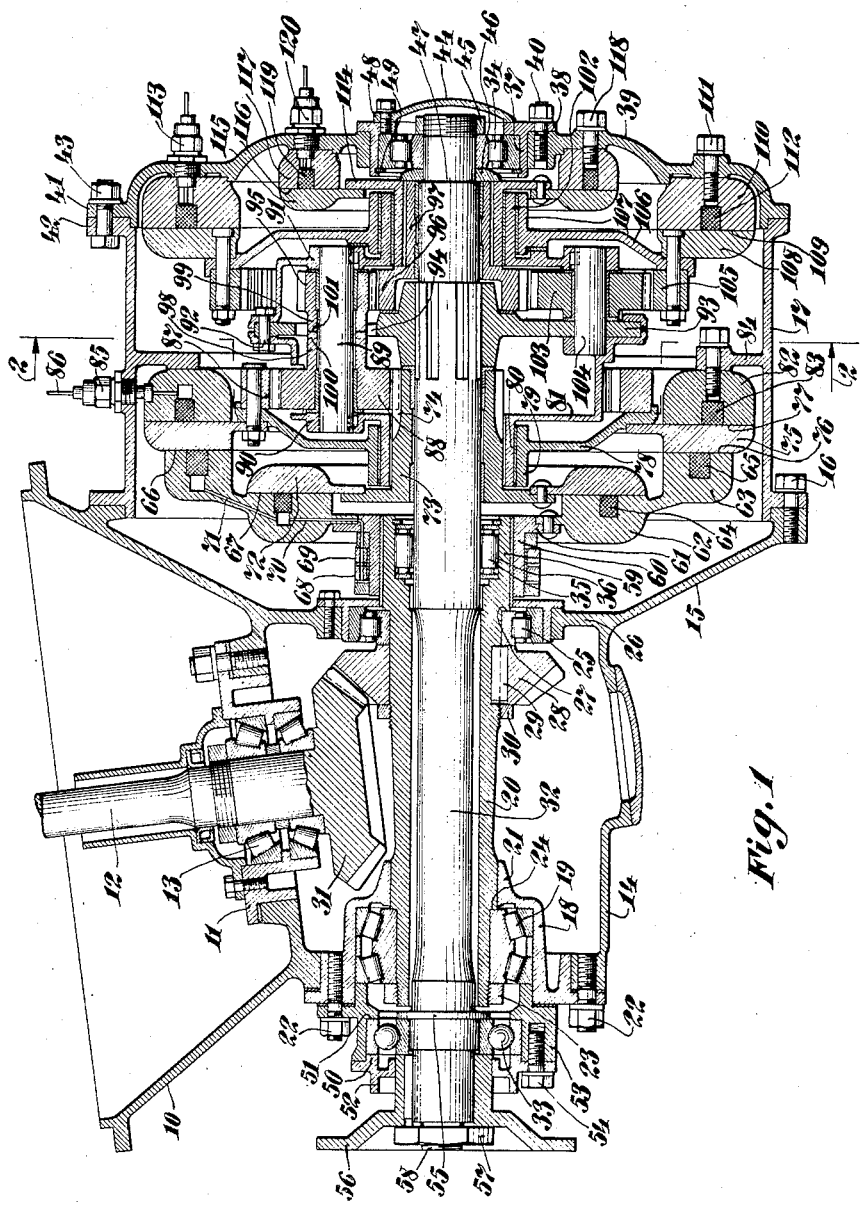
Figure 1 is a view in horizontal section of a typical form of transmission embodying the present invention.

The form of the invention disclosed in Figure 1 includes a planetary transmission which can be disposed at an angle to the axis of the motor shaft and is particularly useful for rear engine vehicles and for vehicles in which the space for the engine and transmission is limited.

The device includes a housing 10 which is adapted to be connected to the crankcase of an engine (not shown), and is provided with a detachable sleeve 11 in which the power shaft 12 is supported for rotation in interposed roller bearings 13. The housing 10 includes a generally cylindrical casing 14 having a frusto-conical extension 15 which is detachably connected as by means of bolts 16 to a cylindrical housing 17 in which the planetary gear transmission is mounted.

At the left-hand end of the case 14, as viewed in Figure 1, is a sleeve 18 having roller bearings 19 therein in which is journaled a tubular driveshaft 20. The sleeve 18 is provided with a restricted end 21 which closely yet rotatably receives the tubular shaft 20. The sleeve 18 is detachably connected to the end of the casing by means of cap screws 22 to allow removal thereof and servicing of the bearings 19. The bearings 19 and shaft 20 are retained against relative axial movement by a nut 23 threaded on the shaft and a shoulder 24 against which the inner race of the bearing 19 is urged by the nut 23. The tubular shaft 20 is likewise journaled in a roller bearing 25 which is detachably mounted in a partition 26 between the casing 14 and the frusto-conical housing 15. The inner race of the bearing is fixed to the shaft 20 by a shoulder 27 on the shaft and a bevel gear 28 which is fixed to the shaft 20 by a key 29 and a nut 30 threaded on the shaft. Rotation is imparted to the shaft 20 by means of a bevel gear 31 on the end of the power shaft 12 which meshes with the bevel gear 28, thus providing an angular drive between the shaft 12 and the tubular shaft 20.

The output or driven shaft 32 of this form of device is disposed internally of the tubular shaft 20 and is journaled at opposite ends in anti-friction bearings 33 and 34, and in an anti-friction bearing 35 adjacent its center, the bearing 35 being mounted in a cavity 36 in the inner end of the tubular shaft 20. The bearing 34 is mounted in an annular sleeve 37 which has a peripheral flange 38 engaging and detachably connected to the end cover 39 of the housing 17 by means of cap screws 40. The end cover 39 is provided with a flange 41 which abuts a flange 42 on the housing 17 and is connected thereto by bolts 43, thereby permitting ready removal of the end cover 39 to allow access to and servicing of the transmission.

The open end of the annular bearing sleeve 37 is closed by a detachable dished cover 44 which upon removal allows the nut 45 to be adjusted on the shaft 32 to engage the inner race of the bearing 34 and urge it against the thrust disc 46 which bears against the shoulder 47 on the shaft 32. The outer race of the bearing 34 is retained in the sleeve 37 by means of an inwardly projecting flange 48 and a snap ring 49 which engage the opposite sides of the race.

The outer race of the anti-friction bearing 33 is retained between the flanges 50 and 51 on the interfitting annular collars 52 and 53 respectively, which are clamped together by screws 54. The collar 53 has a peripheral flange which abuts the sleeve 18 and is held thereagainst by the bolts or screws 22. The inner race of bearing 33 is fixed to the shaft 32 by engagement with a flange 55 and a disc-like connecting member 56 which is keyed to the shaft 32 and urged against the race by a nut 57 threaded on a reduced extension 58 on the shaft 32.

Operation of the power shaft 12 and of the tubular shaft 20 is transmitted to the driven shaft 32 by the planetary gearing and magnetic clutch and brake transmission now to be described.

The tubular shaft 20 has an enlarged inner end 59 on which is mounted in fixed relation a sleeve 60 having a peripheral flange 61. Fixed to the flange 61 and rotatable with the shaft 20 are two annular electromagnets 62 and 63 provided with suitable windings 64 and 65. As illustrated, the electromagnets are formed from a casting of dished form, and are provided with flat machined annular clutch faces 66 and 67.

The sleeve 60 supports a pair of slip rings 68 and 69 which are suitably insulated from the sleeve 60 and each other, and are connected to the windings 64 and 65 of the electromagnets by means of wires passing through the conduits 70 and 71 in the sleeve 60 and electromagnets 62 and 63. Brushes (not shown) engage the slip rings 68 and 69 and are adapted to energize the electromagnets selectively by means of external switches.

An armature 72 forming a clutch element of annular shape cooperates with the electromagnet 62 and is fixedly connected to a sleeve 73 which is journaled on the shaft 32 and has a sun gear 74 on its inner end. The armature 72 may rotate freely or remain stationary when the electromagnet 62 is de-energized, and rotates with the electromagnet 62 and tubular shaft 20 when the electromagnet is energized.

An armature 75 having oppositely facing plane annular faces 76 and 77 cooperates with the electromagnet 63 and is fixed to a dished disc 78 having a sleeve 79 at its inner edge which is rotatably mounted on the sleeve 80 projecting laterally from one end of the housing 81 in which the planet gears, later to be described, are mounted.

A third electromagnet 82, including a suitable winding 83, is fixedly mounted on an annular flange 84 which projects inwardly from the housing 17. An oil tight plug 85 is threaded into the housing 17 and a conductor 86 extends through the plug to supply electrical energy to the winding 83. By energizing the electromagnet 82 and deenergizing the electromagnet 63 the armature 75 may be restrained against movement. By energizing the electromagnet 63 and de-energizing the electromagnet 82 the armature will rotate with the tubular shaft 20. When both of the electromagnets 63 and 82 are deenergized the armature 75 is free to rotate or to remain stationary depending upon the torque exerted on the internal ring gear 87 which is fixed to the armature 75 and the disc 78.

Meshing with the sun gear 74 and the internal gear 87 are a plurality of planet gears 88 (Figures 1 and 3) which are rotatably mounted on shafts 89 extending between and mounted in the cup-shaped sides 90 and 91 of the housing 81. The sides 90 and 91 of the housing 81 are connected as by means of bolts 92 to the periphery of a disk-like spider 93 which is splined to the driven shaft 32, whereby rotation of the housing 81 and the spider 93 will cause the shaft 32 to rotate. The spider 93 has apertures 94 therein through which the shafts 89 extend.

The right-hand ends of the shafts 89 also carry planet gears 95 of smaller diameter than planet gears 88 which mesh with a sun gear 96 on the inner end of a sleeve 97 which is rotatably mounted on the shaft 32. The planet gears 88 and 95 have opposed hubs 98 and 99 provided with interfitting jaw clutch elements 100 and 101 which cause them to rotate together and facilitate assembly and disassembly of the transmission.

The side 91 of the planet gear housing 81 has a laterally projecting sleeve 102 thereon which is journaled on the sun gear sleeve 97, thereby acting with the sleeve 80 on the housing 81 and the spider 93 to form a rigid and stable construction.

The planet gears 95 mesh with larger idler gears 103 which are journaled on the short shafts 104 mounted in the side 91 of the housing 81 and the spider 93. The idler gears 103 also mesh with an internal ring gear 105 which is fixed to a dished disc 106. The disc 106 has a bearing sleeve 107 at its inner periphery which is journaled on the sleeve 102 of the housing 81 and carries at its outer edge an armature 108 having a plane annular face 109.

The armature 108 forms with an annular electromagnet 110 a brake for preventing or allowing free rotation of the ring gear 105. The electromagnet 110 is fixed to the end closure 39 of the housing 17 by means of cap screws 111 and is provided with a winding 112 having a conductor passing through the oil-tight plug 113 which is threaded into the closure 39.

The sun gear sleeve 97 has a flange 114 thereon to which is fixed an armature 115 having a plane annular face 116. The armature 115 cooperates with an annular electromagnet 117 to form a brake which is fixed to the end closure 39 by means of cap screws 118. The winding 119 of the electromagnet 117 is energized from an exterior source of electrical energy by means of a conductor passing through the oil-tight plug 120 threaded into the end closure 39.

It will be understood that one end of each of the windings of the electromagnets 62, 63, 82, 110 and 117 is grounded and the other is connected through suitable switches to a source of electrical energy which allow various combinations of the electromagnets to be energized.

In operation, the various speed changes may be obtained in the following way:

Assuming that the drive shaft 12 and tubular shaft 20 are rotating, a load is applied to the driven shaft 32 and none of the electromagnets are energized; the electromagnets 62 and 63 will rotate with the shaft 20 and the armatures 72 and 75 will remain stationary and no torque is transmitted to the shaft 32.

To drive the shaft 32 in first speed the electromagnets 62 and 82 are energized, thus clutching the sun gear 74 to the tubular shaft 20 and holding the internal gear 87 stationary and causing the planet gears 88 to roll around the internal gear rotating the spider 93 and the driven shaft 32 and following all the other gears to rotate freely.

In second speed, the electromagnets 63 and 110 are energized, thus causing the internal gear 87 to rotate with the tubular shaft 20 and holding the internal gear 105 stationary with all other gears idling. The planet gears 88 are driven by the internal gears 87 causing the idler gears 103 to roll along the internal gear 105 and rotating the spider 93 and the driven shaft 32.

In third speed, the electromagnets 63 and 117 are energized, thus causing the internal gear 87 to rotate with the tubular shaft and the sun gear 96 to be held stationary. The planet gears 95 are caused to roll around the sun gear 96 rotating the spider 93 and the driven shaft 32.

In fourth speed, electromagnets 62 and 63 are energized, thereby causing the sun gear 74 and internal gear 87 to rotate with the tubular shaft 20 and locking the planet gears 88 against rotation. The spider 93 is therefore directly coupled to tubular shaft 20 and the driven shaft 32 rotates therewith.

In first reverse speed the electromagnets 62 and 110 are energized, causing the sun gear 74 to rotate with the tubular shaft 20 and holding the internal gear 105 stationary. The planet gears 88 and 95 and the idler gears 103 are driven with the idler gears 103 rolling on the fixed internal gear 105. The spider 93 and driven shaft 32 are therefore driven at low speed in a direction counter to shaft 20.

In second reverse speed, the electromagnets 62 and 117 are energized, thus causing the sun gear 74 to be driven by the tubular shaft 20 and the sun gear 96 to be held stationary. The planet gear 95 rolls on the sun gear 96 causing the spider 93 and the shaft 32 to be driven at higher speed counter to the direction of rotation of shaft 20.

The construction described above is compact and allows a convenient arrangement and assembly of parts. For example, the use of interfitting jaw clutch elements on the planet gears allows easy assembly of parts and accurate positioning of the planetary gears relatively to each other. The use of different sizes of planet and idler gears allows very desirable ratios without any of the gears being required to rotate at excessive speeds. Also, the use of interfitting parts on the planet gears and the provision of a housing which substantially enclosed the gears and which is supported rigidly on a spider, prevents end play in the gears and assures accurate meshing of the planet gears with the internal, sun and idler gears.

A very strong assembly can be produced for the reason that all of the power is transmitted through the spider directly to the driven shaft. Therefore the spider can be made of sufficient strength to handle any desired torque, and because of its central arrangement in the transmission the cooperating parts can be arranged conveniently and in closely spaced relationship thereto.

The provision of a closure member at the end of the transmission which supports two of the electromagnets allows ready access to these electromagnets for servicing and at the same time permits inspection and adjustment of the various elements of the transmission by merely removing the end closure member 39.

The provision of an angular relationship between the drive and driven shafts also allows the transmission to be used in restricted spaces and allows its positioning in the most convenient positions in the vehicle or other mechanism with which it is to be used.

Figure 2:
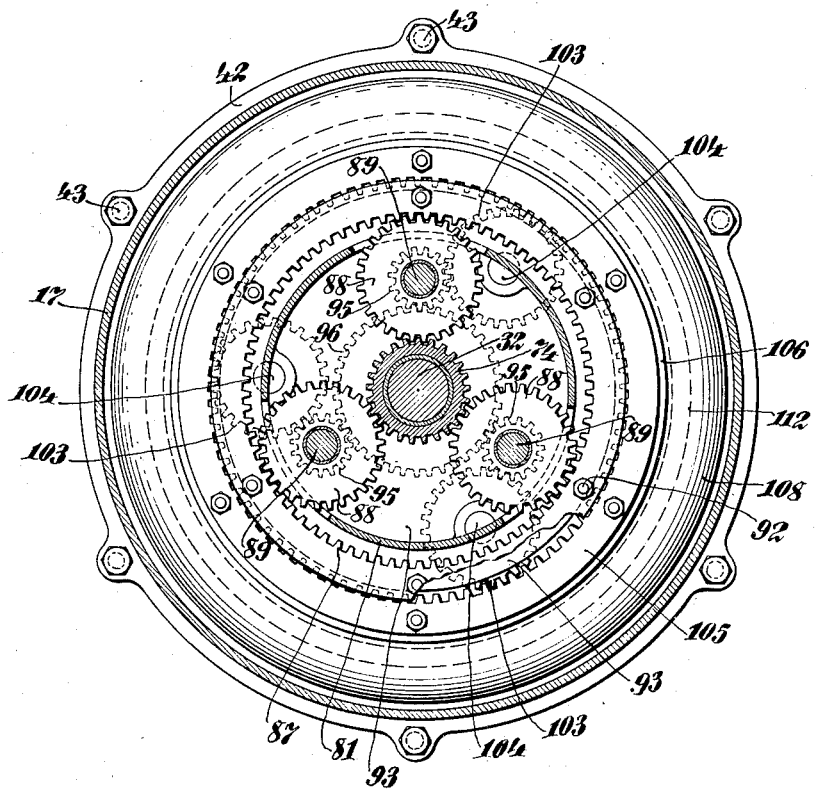
Figure 2 is a view in section taken on line 2—2 of Figure 1.
Figure 3:
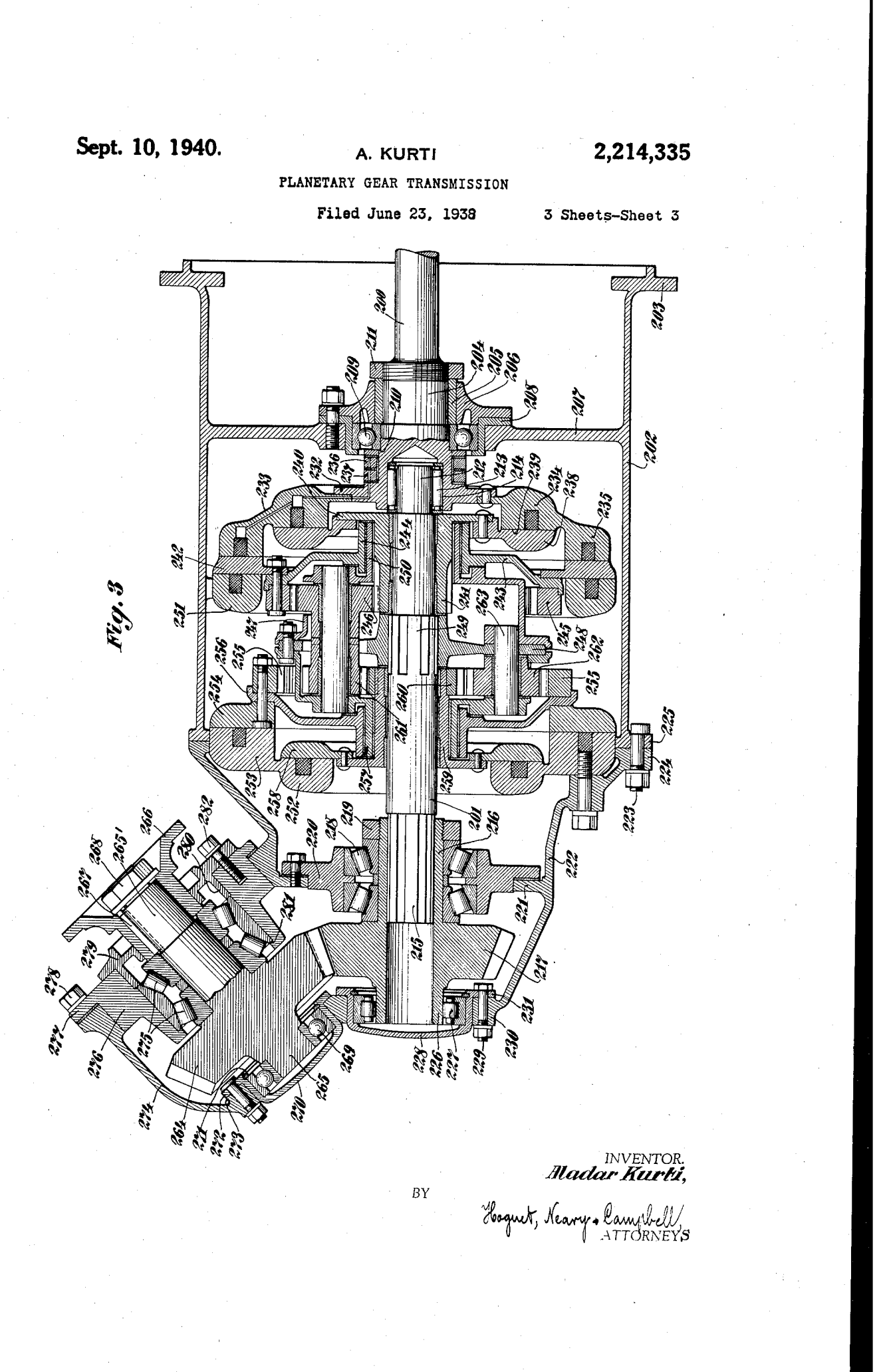

In Figure 3 of the drawings is disclosed another form of the invention in which the electromagnets, their cooperating armatures, and the planetary gear system are substantially identical to the form of the invention disclosed in Figures 1 and 2. In this construction, however, the drive shaft 200 is in axial alignment with the driven shaft 201, both of these shafts being supported centrally of a substantially cylindrical housing 202 which is provided with outwardly directed flanges 203 by means of which it may be attached to the crank case of a motor. The drive shaft 200 includes an enlarged portion 204 on which is mounted a bushing 205 which is received within an annular collar 206. The collar 206 is bolted or otherwise attached to a transverse partition 207 in the casing 202. A bearing collar 208 is interposed between the collar 206 and the partition 207 and acts to retain a roller bearing 209 therein. The collars 206 and 208 are provided with flanges which grip the outer race of the bearing 209 while the inner race of the bearing 209 is fixed to the shaft 200 by engagement between the bushing 205 and a shoulder 210 on the shaft. A nut 211 is threaded on the enlarged portion 204 of the shaft and urges the bushing 205 against the inner race of the bearing.

The driven shaft 201 is provided with a reduced inner end portion 212 which is received within a roller bearing 213, the bearing being mounted in an enlarged bore 214 in the inner end of the shaft 200. The opposite end of the driven shaft 201 is provided with splines 215 which are received within a complementary internally splined sleeve 216 on a beveled gear 217. The inner races of a pair of roller bearings 218 are mounted on sleeve 216 and are fixed thereto by means of a nut 219 threaded on the end of the sleeve which urges the races against the beveled gear 217. The outer races of the roller bearings 218 are received in an annular member 220 which is bolted or otherwise fixed to an inwardly extending partition 221 on a generally frusto-conical housing 222. The housing 222 is detachably connected to the left-hand end of the casing 202 by means of bolts 223 passing through abutting flanges 224 and 225 on the housing and casing members, respectively. The beveled gear 217 is also provided with a bearing portion 226 at its left-hand end which is received in a roller bearing 227, the latter being mounted in a cup-shaped cap 228. The cap 228 is mounted in a circular aperture in the end of the housing 222 and is retained therein by any suitable means such as bolts 229 which pass through flanges 230 and 231 on the casing 222 and cap 228, respectively. A firm and rigid support is thus provided for the driven shaft 201.

The inner end of the drive shaft 200 is provided with a disc-like flange 232 on which is mounted a disc-shaped member 233 forming the armatures of two electromagnets 234 and 235. The windings of the electromagnets 234 and 235 are connected to the commutators 236 and 237 encircling the drive shaft 200 adjacent to the flange 232. The electromagnet 234 cooperates with an armature 238 having a flat annular face 239 which is connected to a disc-shaped flange 240 on the right-hand end of the sun gear 241. The electromagnet 235 cooperates with an armature 242 which is mounted adjacent the periphery of a dished member 243 having a sleeve 244 at its inner end. Adjacent the periphery of the dished member 243 is an internal ring gear 245 which meshes with a series of planet gears 246 which are mounted in a housing 247. The housing 247 is fixedly connected to a spider 248 which is connected by splines 249 to the driven shaft 201. The housing 247 is provided with a sleeve 250 which is rotatably journaled on the sun gear 241. The sleeve 244 of the dished member 243 is journaled on sleeve 250. The planet gears 246 mesh with the sun gear 241 and the internal ring gear 245 and are rotated in response to selective operation of the internal and sun gears to rotate the spider 248 and the driven shaft 201.

The armature 242 also cooperates with a fixed electromagnet 251 which is connected to the casing 202 in any desired way, and acts to form a brake for either preventing or allowing free relative rotation of the armature 242.

The transmission also includes another pair of electromagnets 252 and 253. The electromagnet 253 cooperates with a rotatable armature 254 which is connected to an internal gear 255 and supported on a dished member 256 which is rotatably journaled on a sleeve 257 projecting from the left-hand side of the planetary gear housing 247. The electromagnet 252 cooperates with a rotatable armature 258 which is fixed to the outer end of a sleeve 259 having a sun gear 260 at its inner end. The sleeve 259 is rotatably mounted on the driven shaft 201 and supports rotatably the sleeve 257 on the planetary gear housing 247. Small planet gears 261 which are detachably coupled to the planet gears 246 mesh with the sun gear 260 and also with idler gears 262 which mesh with the internal ring gear 255. The idler gears are rotatably mounted on transverse shafts 263 extending between the planetary gear housing 247 and the spider 248.

The combination of electromagnetic clutches, sun, planetary, and internal gears described above is substantially the same as that disclosed in Figures 2 and 3 of the drawings and is controlled in exactly the same way to obtain four forward speeds and two reverse speeds.

The operation of driven shaft 201 is taken off at an angle by a beveled gear 264 which meshes with the beveled gear 217 on the left-hand end of the driven shaft. The beveled gear 264 is provided with oppositely directed shafts 265 and 265', the latter having a coupling member 266 connected thereto by means of a key 267 and a retaining nut 268. The short shaft 265 is mounted in a ball-bearing 269 which is supported in a cup-shaped closure 270 and is retained therein by means of a snap ring 271. The cup-shaped closure member 270 is provided with laterally directed flanges 272 which abut flanges 273 adjacent an opening in the left-hand end of a small housing 274 which is arranged at an angle to the main casing 201 and may be formed integrally with the housing 222 as by casting or by any other desired method. The shaft 265' is mounted in roller bearings 275 which are retained on the shaft 265' by engagement with the lateral face of the beveled gear 264 and by engagement of the connecting member 266 against the outer edge of the inner race of the bearing. The outer race of the bearings 275 is mounted in a sleeve 276 which has a laterally projecting flange 277 overlying and connected to the end of the housing 274 as by means of screws 278. An inner collar 279 is mounted within the sleeve 276 and has an annular flange 280 therein which engages an edge of the outer race and retains it in abutment with the shoulder 281 on the sleeve 276. The collar 279 is attached to the sleeve 276 by means of screws 282.

This construction likewise provides a simple, compact and easily accessible construction which may be readily taken down for servicing. Likewise, the angular relationship between the output end of the device and the drive end of the device permits the use of this construction in spaces which are either too small for the ordinary transmission or inconveniently situated.

It will be seen that the constructions described above provide adequate support for all of the various elements of the device, thereby resulting in reduction of friction losses, vibration and relative shifting of the various parts, and causing the gears to mesh properly and to operate without excessive wear.

Either of the devices disclosed above may be provided with force feed lubrication systems if desired, or they may be adapted to run in oil, thereby assuring adequate lubrication of all the parts of the transmission.

It will be understood that many variations can be made in the relationship, size and proportions of the parts, such as, for example, the gear ratios of the sun, planet and internal gears, to produce any desired range of transmission speeds. Such changes should be considered as being within the contemplation of the present invention as defined in the following claims.

I claim:

1. In a planetary transmission, the combination of a drive shaft, a driven shaft, electromagnetic clutch elements rotatable in response to rotation of the drive shaft, a first sun gear, a first internal gear, armatures on said gears forming clutch elements cooperating with said electromagnet clutch elements, a fixed electromagnetic brake element cooperating with the armature on the first internal gear, a second sun gear, a second internal gear, armatures forming brake elements on said second sun and internal gears, fixed electromagnetic brake elements cooperating with the armatures on said second internal and sun gears, a spider fixed to said drive shaft and interposed between said first and second gears, said gears and shafts being coaxial and relatively rotatable, a first planet gear rotatably mounted on said spider and meshing with said first sun and internal gears, a second planet gear fixed to said first planet gear and meshing with said second sun gear and an idler gear meshing with said second planet and internal gears, whereby upon energizing said electromagnetic clutch and brake elements selectively in pairs the drive shaft will actuate the driven shaft to produce four forward and two reverse speeds.

2. In a planetary transmission, the combination of a drive shaft, a driven shaft, clutch elements fixed to and rotatable in response to operation of the drive shaft, a first sun gear, a first internal gear, clutch elements on said sun and internal gears cooperating with the clutch elements on the drive shaft and effective to cause the sun gear and internal gear to rotate with said drive shaft, a fixed brake element cooperating with the clutch element on said internal gear effective to prevent rotation of the internal gear, a second sun gear, a second internal gear, brake elements on said second gears, fixed brake elements cooperating with the brake elements on said second sun and internal gears to selectively prevent rotation of said second gears, a spider fixed to said driven shaft and interposed between said first and second gears, said gears and shafts being coaxial and relatively rotatable, a first planet gear rotatably mounted on said spider and meshing with said first sun and internal gears, a second planet gear fixed to said first gear and meshing with said second sun gear, and an idler gear meshing with said second planet and internal gears, whereby upon actuating said clutch and brake elements selectively in pairs the drive shaft will actuate the driven shaft to produce four forward and two reverse speeds.

3. In a planetary transmission the combination of a casing having a detachable end closure, a drive shaft and a driven shaft rotatably mounted in said casing, a first sun gear, a first internal gear, said gears being relatively rotatable and being journaled on one of said shafts, clutch elements fixed to said gears, cooperating clutch elements on said drive shaft and selectively operable to cause the said gears to rotate with the drive shaft, a brake element fixed to said casing and selectively operable to prevent rotation of the internal gear, a second sun gear, a second internal gear, brake elements on said second gears, said gears being relatively rotatable and journaled on one of said shafts, cooperating brake elements fixed to said end closure and selectively operable to prevent rotation of said second sun and internal gears, a spider fixed to the driven shaft and interposed between said first and second gears, a first planet gear rotatably mounted on said spider and meshing with said first sun and internal gears, a second planet gear fixed to said first gear and meshing with said second sun gear, and an idler gear meshing with said second planet and internal gears, whereby upon actuating said clutch and brake elements selectively in pairs the drive shaft will actuate the driven shaft to produce four forward and two reverse speeds.

4. The planetary transmission set forth in claim 2 in which the drive shaft is tubular and the driven shaft is rotatably mounted within the drive shaft.

5. The planetary transmission set forth in claim 3 in which the clutch and brake elements fixed to the drive shaft, the casing and the end closure are electromagnets.

6. The planetary transmission set forth in claim 2 comprising housing elements fixed to said spider, bearing sleeves extending laterally from said housing and affording lateral stability to said spider, and shafts mounted in said housing in parallel relationship to said drive and driven shafts and rotatably supporting said planet gears.

7. The planetary transmission set forth in claim 2 comprising housing elements fixed to said spider, shafts mounted in said housing, planet gears rotatably mounted on and adjacent the ends of each shaft, and interengaging clutch elements on the planet gears mounted on the same shaft for coupling said planet gears.

ALADAR KURTI.

CERTIFICATE OF CORRECTION.

Patent No. 2,214,335. September 10, 1940.

ALADAR KURTI.

It is hereby certified that error appears in the printed specification of the above numbered patent requiring correction as follows: Page 5, first column, line 72, claim 1, for the word "drive" read --driven--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.